No. 748,090. Patented December 29, 1903.

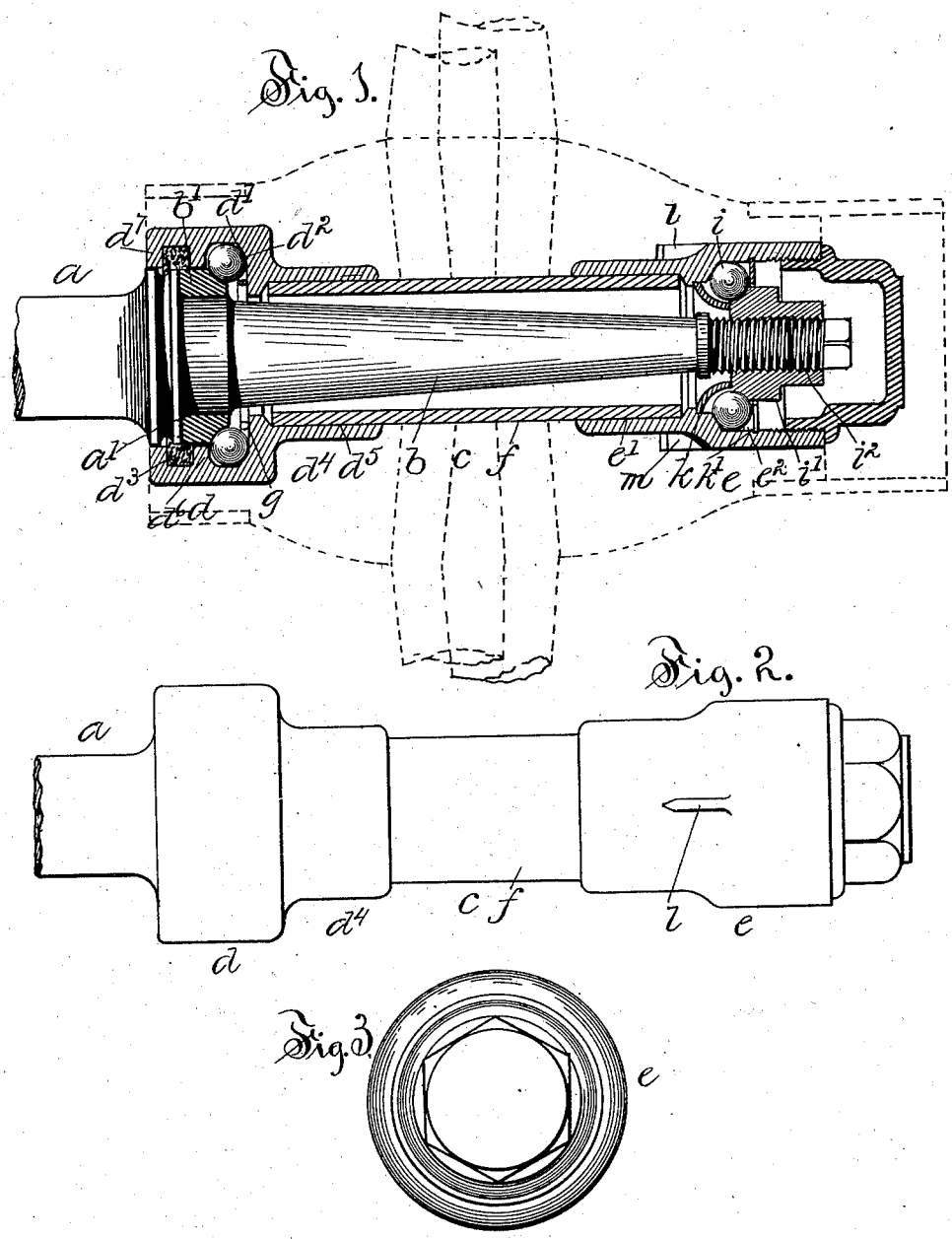

UNITED STATES PATENT OFFICE.

CHARLES T. McCUE, OF HARTFORD, CONNECTICUT, ASSIGNOR TO THE PREMIER MANUFACTURING COMPANY, OF HARTFORD, CONNECTICUT, A CORPORATION OF CONNECTICUT.

WHEEL-BEARING.

SPECIFICATION forming part of Letters Patent No. 748,090, dated December 29, 1903.

Application filed March 29, 1901. Serial No. 53,541. (No model.)

*To all whom it may concern:*

Be it known that I, CHARLES T. McCUE, a citizen of the United States, and a resident of Hartford, in the county of Hartford and State of Connecticut, have invented certain new and useful Improvements in Wheel-Bearings, of which the following, taken in connection with the accompanying drawings, is a full, clear, and exact description, whereby any one skilled in the art can make and use the same.

The invention pertains to bearings, and especially to those used for vehicle-wheels; and the object of the invention is to so arrange the several parts of the bearing that they may be quickly and easily assembled, insuring a proper alinement of the parts and forming when once in place a simple, effective, and perfectly-alined bearing.

A further object is to form the bearing as a whole in separable sections, providing a device the parts of which may be easily and nicely made to gage and adapted to be applied with the least possible trouble and liability to imperfect alinement.

Referring to the drawings, Figure 1 is a sectional view of the box and bearings, showing the hub of the wheel in dotted outline. Fig. 2 is a plan view of the bearing-box in place on the axle-arm. Fig. 3 is an end view of the parts shown in Fig. 2.

In the accompanying drawings the letter $a$ denotes the axle, terminating in the axle-arm $b$. Surrounding the axle-arm is the box $c$, comprising three parts, the two bearing-sections $d$ $e$ and the intermediate connecting-tube $f$.

The bearing-section $d$ surrounds the shoulder $a'$ of the axle and is provided with an enlarged portion in which is formed the raceway $d'$, within which are located balls $d^2$, which coöperate with a cone $b'$, seated against the shoulder $a'$. The axle adjacent to this shoulder is provided with an annular groove, which is oppositely disposed to a recess $d^3$, within which may be arranged a washer to prevent the entrance of dust and grit to the bearing.

The section $d$ terminates in a reduced portion $d^4$, provided with a finished socket $d^5$, within which is fitted the sleeve $f$. A retainer $g$ prevents disarrangement of the balls. This section $d$ is provided with a ball-retaining flange $d^6$, extending around the inner surface of the section and forming one wall of the ball-race, and also with an annular flange $d^7$, that forms, in connection with the flange $d^6$, a groove, in which is located a packing for the purpose of excluding dust from the bearing. These flanges $d^6$ and $d^7$ are made integral with the bearing-section $d$, and this forms an important feature of my invention, as I am not aware that such a construction has ever before been made. The construction necessitates the location of the retainer $g$ back of the balls $d^2$, and for this purpose the retainer is formed of a split ring, which is sprung into place after the balls have been located, the ring being loosely held in position, but preventing the balls from dropping out of the ball-race.

In devices of this class prior to my construction the flange forming the ball-race and the flange for forming the dust-washer groove have been usually held in place by means of interengaging screw-threads, and in a vehicle of this class this has necessitated the forming of right and left hand screw-threads in the ends of the hub in order to prevent the parts working loose in use. Such a construction is undesirable, and by forming the flange integral I have removed this objection and provided a construction necessitating much less trouble in its manufacture and which is much cheaper both in the saving of time and money.

The opposite end of the tubular sleeve $f$ is adapted to fit into a socket $e'$ of the bearing-section $e$, which also has an enlarged portion provided with a ball-race $e^2$ and balls $i$, which coöperate with an adjustable cone $i'$, threaded to engage the screw-threaded end of the axle-arm $b$. Retainers $k$ $k'$ are provided for holding the balls against displacement when the cone $i'$ is removed. In the form shown the retainer $k'$ consists of a split ring sprung into place and held as in a groove or against a shoulder in front of the balls. The retainer $k$ has a flaring bell-shaped mouth adapted to fit against a shoulder in the hub, as shown, and preferably being of a size to fit snugly therein.

A screw-threaded cap fits within the outer end of the bearing-section e and effectually closes the bearing against the entrance of grit and dust. The adjustable cone i' is of tubular form and of sufficient length to project beyond the end of the axle-arm, and a screw-threaded check-plug i² is screwed into its end and against the end of the axle, firmly locking the cone in any desired position of adjustment on the axle-arm. On the outer surface of the bearing-section and preferably on opposite sides thereof are pins l m, having sharpened ends and adapted to be driven into the hub of the wheel to prevent relative movement of the hub and bearing-box.

In assembling the bearing and securing it in place in a wheel-hub the sleeve f is driven or started into the section d and these parts introduced at one side of the hub, while the bearing portion e is started into the opposite side of the hub and engages the sleeve f. When the parts have been finally started and are properly engaged, they are driven home and the two bearing-sections are located when the sleeve has reached the bottoms of their respective sockets.

A special advantage is obtained by arranging the tubular connecting portion f within the sockets of the bearing portions d and e, as by so doing the splinters of the hub cannot become lodged between the ends of the sleeve and the abutting shoulders of the bearing portions, thus destroying the alinement of the bearings and the gage between the lines of balls along the axle-arm. A further and important feature of locating the sleeve f within the bearing portion d and e resides in the fact that a maximum thickness of that portion of the hub containing the spokes is obtained in a minimum thickness of hub which is desirable on account of appearance, a tenon of sufficient depth being thus provided for properly holding the spokes and at the same time not necessitating the use of a hub of such diameter as to be unsightly.

Obviously the specific details herein shown might be modified to a great extent without departing from the spirit of the invention, which contemplates making an antifriction-bearing and containing box for wheels in sectional form so that the several parts may be readily assembled in the hub, insuring perfect alinement and gage between the ball-bearings at the ends of the axle-arm.

The device described herein has certain advantages, especially when used in connection with a wooden hub, in connection with which a partial description has been given herein; but it is obvious that there are other advantages present in the structure when used in other forms of wheels, and I do not wish to limit myself to the combination in a wooden wheel, but desire to avail myself of all the advantages present in the structure in whatever form of wheel it may be used.

What I claim as my invention, and desire to secure by Letters Patent, is—

1. In combination in a wheel-hub, a bearing portion comprising independent bearing members, internal sockets formed within the opposing ends of said bearing members, and a connecting and alining sleeve of a diameter throughout its length equal to the diameter of said sockets adapted to be forced into said sockets whereby the parts may be assembled in the wheel-hub by forcing them together under pressure.

2. In combination in a wheel-hub, a wheel-bearing comprising independent bearing members adapted to be applied to opposite ends of the hub, a connecting and alining sleeve of uniform diameter adapted to join said bearing members, splines for preventing relative rotation of the bearing members and hub, and sockets formed in the opposing ends of the bearing members of a diameter equal to the external diameter of the alining-sleeve whereby the connecting and alining sleeve may be forced into the bearing members as they are applied to the wheel-hub from opposite ends.

3. In a wheel-bearing, in combination, an axle-arm, a pair of bearing-sections provided with antifriction-bearings coöperating with said axle-arm to support a wheel and having sockets in the adjacent ends of said bearing-sections, a connecting and alining sleeve of uniform diameter adapted to be driven into the sockets whereby said socket members may be driven into the hub and secured with relation to the sleeve from opposite ends of said hub, and a hub adapted to receive the parts from opposite ends thereof.

4. In a ball-bearing, a pair of bearing-sections each provided with a recess adapted to receive the balls of an antifriction-bearing, balls for said bearing, said bearing-sections being provided with sockets formed in the opposing ends of the bearing-sections and adapted to be forced over a connecting and alining sleeve of uniform diameter, a connecting and alining sleeve, an axle-arm, cones on said axle-arm coöperating with the balls of the bearing-sections, means for adjusting one of said cones, a cap closing the end of the bearing, said bearing-sections and alining-sleeve being arranged to be inserted in a wheel-hub from opposite ends thereof, and the wheel-hub.

5. In a ball-bearing, in combination with a support having a cone, a member arranged for the reception of balls and provided with two integral flanges, said flanges arranged upon opposite sides of the cone and forming the walls of a ball-race, balls located within said race and adapted to coact with the cone and one of said integral flanges, and a spring-retainer arranged adjacent to said flange and adapted to coöperate with the second-named integral flange for retaining the balls in the ball-race.

6. In a ball-bearing, in combination with a support provided with a cone, a member arranged for the reception of balls and provided with a recess formed by two integral flanges, one of said flanges forming the front wall of the ball-race, a ball-retainer located against said flange and coöperating with the second-named flange to form an opening less in diameter than the diameter of the balls, and balls arranged between the front wall of the ball-race and the cone of the support.

7. In a wheel-bearing, in combination with a hub, a sleeve located within the hub, an axle-arm provided with a cone, a bearing-section located at one end of the hub and having an integral flange forming one wall of a ball-race, a second integral flange opposite said wall, a ball-retainer loosely supported against the first-named integral flange and coöperating with the second-named flange, and balls located in the ball-race held by the retainer and flange and coöperating with the cone whereby the support and cone may be withdrawn without freeing the balls from the ball-race.

8. In a ball-bearing, in combination with an axle member provided with a cone adjustably mounted thereon, a sleeve encircling said axle member and arranged to form a ball-bearing, balls intermediate said bearing and the cone and a pair of spring ball-retainers adapted to be sprung into the sleeve upon opposite sides of said bearing with a free space between the adjacent edges of said retainer members whereby the cone may engage the balls of the ball-bearing.

9. In a ball-bearing, in combination with a hub and an axle, a sleeve located within the hub and arranged to form a ball-bearing, a pair of spring ball-retainers adapted to be sprung into the sleeve upon opposite sides of said bearing and a coöperating cone member adjustably secured to the axle and adapted to engage the balls of the ball-bearing between the adjacent edges of the ball-retaining members.

10. In a bearing, in combination with a support and a member arranged for the reception of balls, a flange integral with said member and forming one wall of a ball-race, and a second flange formed integral with said member and coöperating with the first-named flange and forming a dust-washer groove.

CHARLES T. McCUE.

Witnesses:
T. F. AHERN,
A. B. JENKINS.